UNITED STATES PATENT OFFICE.

HERMON W. LADD, OF NEW YORK, N. Y.

IMPROVEMENT IN THE MANUFACTURE OF IMITATION GILT MOLDINGS.

Specification forming part of Letters Patent No. 38,588, dated May 19, 1863.

*To all whom it may concern:*

Be it known that I, HERMON W. LADD, of the city, county, and State of New York, have invented a new and useful Improvement in the Manufacture of Imitation Gilt Molding; and I do hereby declare that the following is a full, clear, and exact description of the same.

Imitation gilt molding is usually manufactured by covering the molding with silver-leaf, and after the leaf has been applied the surface is burnished and covered with gold-lacquer, whereby it assumes the appearance of real gold. Silver-leaf is expensive, and, furthermore, it takes a very long time and great care to apply the same to the molding. The leaves are small and very thin, and one leaf after the other has to be placed in position, and with the greatest care the joints between the several leaves cannot be wholly concealed.

The object of this invention is to use long narrow strips of tin-foil, or other cheap metal foil, sufficient to cover the whole length of the molding without joints, and capable of being applied by means of a roller, which presses and stretches the same into and on the different members of the molding.

In order to enable others skilled in the art to fully understand my invention, I will proceed to describe it.

Tin-foil, or foil of alloys of tin or of other suitable metals or compositions of metals, is made in sheets of considerable length and width. These sheets I cut up in long narrow strips, according to the length and width of the molding to be covered. The molding, which is prepared with the ordinary composition, is placed flat down, and the strip of tin-foil or other metal is applied to it by means of a flexible roller or other suitable device capable of pressing and stretching the metal on and into the different members of the molding. Metal foil, and particularly tin-foil, is made of sufficient thickness so that the same readily stretches and conforms to the shape of the molding, whereas ordinary silver-leaf is much too thin and brittle to allow of being stretched. Furthermore, with tin or metal foil the whole length of the molding can be covered with one continuous strip, producing an unbroken surface, which is capable of receiving a high polish, and which shows no joints or breaks like the surfaces of moldings covered with silver-leaf in the ordinary manner. After the tin-foil has been applied to the molding I coat the same with quicksilver, and thereby I am enabled to give to the surface a high finish by burnishing in the ordinary manner; and, furthermore, those portions which are desired to appear mate are brought in the desired condition by the application of the quicksilver, which combines with the tin, and which, when not burnished, dims the surface. When properly burnished the whole is varnished with the ordinary gold-lacquer, and the molding is ready for sale.

By using tin-foil I am enabled to produce figures in the surface by stamping or chasing, the tin having body enough to allow of either of these operations.

I do not claim broadly the use of tin as a gilding material, nor the employment of quicksilver to brighten the surface thereof; but,

Having thus fully described my invention, what I claim as new, and desire to secure by Letters Patent, is—

The method herein described of producing foil-covered moldings, which method consists in having each sheet or piece of foil made to cover the entire face of the molding, then pressing and stretching the foil upon the molding, and then dressing the foil with quicksilver, all in the manner herein described.

HERMON W. LADD.

Witnesses:
M. S. PARTRIDGE,
DANIEL ROBERTSON.